US011533609B2

(12) United States Patent
Pan et al.

(10) Patent No.: US 11,533,609 B2
(45) Date of Patent: Dec. 20, 2022

(54) MESSAGE PROTECTION METHOD AND APPARATUS

(71) Applicant: HUAWEI TECHNOLOGIES CO., LTD., Guangdong (CN)

(72) Inventors: Kai Pan, Shanghai (CN); He Li, Shanghai (CN); Jing Chen, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/941,769

(22) Filed: Jul. 29, 2020

(65) Prior Publication Data

US 2020/0359202 A1 Nov. 12, 2020

Related U.S. Application Data

(63) Continuation of application No. PCT/CN2019/073373, filed on Jan. 28, 2019.

(30) Foreign Application Priority Data

Jan. 30, 2018 (CN) .......................... 201810089074.5

(51) Int. Cl.
*H04W 12/03* (2021.01)
*H04W 12/06* (2021.01)
(Continued)

(52) U.S. Cl.
CPC ......... *H04W 12/03* (2021.01); *H04W 12/041* (2021.01); *H04W 12/06* (2013.01);
(Continued)

(58) Field of Classification Search
CPC ... H04W 12/03; H04W 12/041; H04W 12/06; H04W 12/106; H04W 36/0022;
(Continued)

(56) References Cited

U.S. PATENT DOCUMENTS 7,280,546 B1 10/2007 Sharma et al.
2014/0295800 A1 10/2014 He
(Continued)

FOREIGN PATENT DOCUMENTS

CN 101094497 A 12/2007
CN 101378591 A 3/2009
(Continued)

OTHER PUBLICATIONS

3GPP TSG SA WG3 (Security) Meeting #89,S3-173076: Idle mode mobility from 4G to 5G Nokia Nov. 27-Dec. 1, 2017, Reno (US) total 4 pages.
(Continued)

*Primary Examiner* — Mazda Sabouri
(74) *Attorney, Agent, or Firm* — Womble Bond Dickinson (US) LLP

(57) ABSTRACT

A message protection method and an apparatus are disclosed. The method includes: When a terminal prepares to hand over from a first-standard system to a second-standard system, the terminal may not have a security context of the second-standard system after handover. Therefore, in the method of the present disclosure, the terminal performs integrity protection on a registration request message and a location update request message by using an integrity key in a security context of the first-standard system before handover. Both the registration request message and the location update request message are messages for triggering handover. Therefore, in the method, security protection is implemented on the message for triggering handover, thereby helping improve communication security.

9 Claims, 6 Drawing Sheets

(51) Int. Cl.
  *H04W 36/00* (2009.01)
  *H04W 60/04* (2009.01)
  *H04W 12/041* (2021.01)
  *H04W 12/106* (2021.01)

(52) U.S. Cl.
  CPC ..... *H04W 12/106* (2021.01); *H04W 36/0022* (2013.01); *H04W 36/0038* (2013.01); *H04W 60/04* (2013.01)

(58) Field of Classification Search
  CPC ............. H04W 36/0038; H04W 60/04; H04W 12/0433; H04W 36/12; H04W 4/02; H04W 12/02; H04W 36/0011; H04W 36/0033; H04L 29/12; H04L 61/6022
  See application file for complete search history.

(56) References Cited

U.S. PATENT DOCUMENTS

| | | | |
|---|---|---|---|
| 2015/0334626 A1 | 11/2015 | Chen et al. | |
| 2019/0104447 A1* | 4/2019 | Horn | ................. H04W 36/0038 |

FOREIGN PATENT DOCUMENTS

| | | |
|---|---|---|
| CN | 101848443 A | 9/2010 |
| CN | 102869057 A | 1/2013 |
| CN | 103428689 A | 12/2013 |
| CN | 103201986 B | 12/2014 |
| EP | 2315371 A2 | 4/2011 |
| WO | 2010025280 A2 | 3/2010 |

OTHER PUBLICATIONS

Nokia, "Idle mode mobility from EPS to 5GS", 3GPP TSG SA WG3 (Security) Meeting #90, S3-180233, 22 Jan. 26, 2018, Gothenburg (Sweden), total 5 pages.

3GPP TSG SA WG3 (Security) Meeting #89, s3-173048: Security for idle mobility between 4G and 5G ZTE Nov. 27-Dec. 1, 2017, Reno, Nevada, USA total 3 pages.

\* cited by examiner

MESSAGE PROTECTION METHOD AND APPARATUS

CROSS-REFERENCE TO RELATED APPLICATIONS

This application is a continuation of International Application No. PCT/CN2019/073373, filed on Jan. 28, 2019, which claims priority to Chinese Patent Application No. 201810089074.5, filed on Jan. 30, 2018. The disclosures of the aforementioned applications are hereby incorporated by reference in their entireties.

TECHNICAL FIELD

The present disclosure relates to the field of mobile communications technologies, and in particular, to a message protection method and an apparatus.

BACKGROUND

Application of a new-standard system requires interaction with an old-standard system. For example, interaction with a second generation (2G) system needs to be considered when a third generation (3G) system is designed, interaction with the 3G system needs to be considered when a fourth generation (4G) system is designed, and interaction with the 4G system needs to be considered when a fifth generation (5G) system is designed.

In the prior art, a method for protecting a message for triggering handover between different standard systems is: If a terminal has a proper security context, the terminal protects the message by using the security context; and if the terminal does not have a proper security context, the terminal does not protect the message. The proper security context is a security context applicable to a standard system after handover.

With development of communications technologies, a new-standard system (for example, 5G) has a higher requirement on protection of a message for triggering handover between different standard systems. The requirement is specifically: Even if a terminal does not have a proper security context, the message still needs to be protected.

In the foregoing scenario of handover between different standard systems, currently, there is no corresponding solution to how to perform security protection on the message for triggering handover.

SUMMARY

The present disclosure provides a message protection method and an apparatus, to implement security protection on a message for triggering handover.

According to a first aspect, the present disclosure provides a message protection method, applied to handover of a terminal from a first-standard system to a second-standard system, where the first-standard system includes a first mobility management network element, and the second-standard system includes a second mobility management network element. The method includes: First, the terminal generates a second message authentication code (MAC) based on a registration request message and an integrity key, and generates a first MAC based on a location update request message and the integrity key, where the registration request message is used to request to register with the second-standard system, the integrity key is an integrity key for communication between the first mobility management network element and the terminal, the first MAC is used to verify the location update request message, and the second MAC is used to verify the registration request message. Then, the terminal sends a protected registration request message and a protected location update request message to the second mobility management network element, where the protected registration request message includes the second MAC, and the protected location update request message includes the first MAC.

In the foregoing method, when the terminal prepares to hand over from the first-standard system to the second-standard system, the terminal may not have a security context of the second-standard system after handover. Therefore, in the method of the present disclosure, the terminal performs integrity protection on the registration request message and the location update request message by using an integrity key in a security context of the first-standard system before handover. Both the registration request message and the location update request message are messages for triggering handover. Therefore, in the method, security protection is implemented on the message for triggering handover, thereby helping improve communication security.

In one embodiment, that the terminal generates a second MAC based on a registration request message and an integrity key includes: The terminal generates the second MAC based on the registration request message, the location update request message, and the integrity key; or the terminal generates the second MAC based on the registration request message, the location update request message, the first MAC, and the integrity key; or the terminal generates the second MAC based on the registration request message, the first MAC, and the integrity key.

Several specific implementations of generating the second MAC are provided in the foregoing method, and may be selected according to different requirements during actual application.

In one embodiment, further, the terminal further receives a command message from the second mobility management network element, where the command message is used to indicate the terminal to derive a root key of the second-standard system based on a root key of the first-standard system, and the integrity key is derived based on the root key of the first-standard system.

In the foregoing method, after receiving the command message, the terminal derives the root key of the second-standard system based on the root key of the first-standard system, so as to subsequently derive, by using the root key of the second-standard system, another key used for communication in the second-standard system.

In one embodiment, before that the terminal generates a second MAC based on a registration request message and an integrity key, the method further includes: The terminal determines that the location update request message needs to be sent.

In the foregoing method, the terminal performs the method in any one of the foregoing embodiments only when determining that the location update request message needs to be sent. This helps avoid a waste of resources.

In an implementation, that the terminal determines that the location update request message needs to be sent includes: If determining that the first mobility management network element does not have a capability of verifying integrity of the registration request message for the second-standard system, the terminal determines that the location update request message needs to be sent.

In other words, when the terminal determines that the first mobility management network element cannot verify integrity of the registration request message, the location update request message needs to be sent, and the first mobility management network element can verify integrity of the location update request message, so as to verify a handover process of the terminal.

According to a second aspect, the present disclosure provides a message protection method, applied to handover of a terminal from a first-standard system to a second-standard system, where the first-standard system includes a first mobility management network element, and the second-standard system includes a second mobility management network element. The method includes: First, the terminal generates a MAC based on a registration request message and an integrity key, where the registration request message is used to request to register with the second-standard system, the integrity key is an integrity key for communication between the first mobility management network element and the terminal, and the MAC is used to verify the registration request message. Then, the terminal sends a protected registration request message to the second mobility management network element, where the protected registration request message includes the MAC.

In the foregoing method, when the terminal prepares to hand over from the first-standard system to the second-standard system, the terminal may not have a security context of the second-standard system after handover. Therefore, in the method of the present disclosure, the terminal performs integrity protection on the registration request message by using an integrity key in a security context of the first-standard system before handover. The registration request message is a message for triggering handover. Therefore, in the method, security protection is implemented on the message for triggering handover, thereby helping improve communication security.

In one embodiment, further, the terminal further receives a command message from the second mobility management network element, where the command message is used to indicate the terminal to derive a root key of the second-standard system based on a root key of the first-standard system, and the integrity key is derived based on the root key of the first-standard system.

In the foregoing method, after receiving the command message, the terminal derives the root key of the second-standard system based on the root key of the first-standard system, so as to subsequently derive, by using the root key of the second-standard system, another key used for communication in the second-standard system.

In one embodiment, before that the terminal generates a MAC based on a registration request message and an integrity key, the method further includes: The terminal determines that a location update request message does not need to be sent.

In the foregoing method, the terminal performs the method in any one of the foregoing embodiments only when determining that the location update request message does not need to be sent. This helps avoid a waste of resources.

In an implementation, that the terminal determines that a location update request message does not need to be sent includes: If determining that the first mobility management network element has a capability of verifying integrity of the registration request message for the second-standard system, the terminal determines that the location update request message does not need to be sent.

In other words, when the terminal determines that the first mobility management network element can verify integrity of the registration request message, the location update request message does not need to be sent, and the first mobility management network element may verify integrity of the registration request message, so as to verify a handover process of the terminal.

According to a third aspect, the present disclosure provides a message protection method, applied to handover of a terminal from a first-standard system to a second-standard system, where the first-standard system includes a first mobility management network element, and the second-standard system includes a second mobility management network element. The method includes: First, the second mobility management network element receives a protected location update request message and a protected registration request message that are from the terminal, where the protected location update request message includes a first MAC, the protected registration request message includes a second MAC, the first MAC is generated based on a location update request message and an integrity key, the first MAC is used to verify the location update request message, the second MAC is generated based on a registration request message and the integrity key, the second MAC is used to verify the registration request message, the registration request message is used to request to register with the second-standard system, and the integrity key is an integrity key for communication between the first mobility management network element and the terminal. Then, the second mobility management network element sends a context request message to the first mobility management network element, where the context request message includes the protected location update request message, and the context request message is used to request a security context of the terminal. Then, the second mobility management network element receives a context response message from the first mobility management network element, where the context response message includes the security context of the terminal. Then, the second mobility management network element verifies the registration request message based on the second MAC and the security context of the terminal.

In the foregoing method, when the terminal prepares to hand over from the first-standard system to the second-standard system, the terminal may not have a security context of the second-standard system after handover. Therefore, in the method of the present disclosure, the terminal performs integrity protection on the registration request message and the location update request message by using an integrity key in a security context of the first-standard system before handover. Both the registration request message and the location update request message are messages for triggering handover. Therefore, the second mobility management network element receives the protected registration request message and the protected location update request message. Further, the second mobility management network element further sends the protected location update request message to the first mobility management network element. The first mobility management network element verifies the location update request message, and if the verification succeeds, sends the security context of the terminal to the second mobility management network element. Therefore, in the method, security protection is implemented on the message for triggering handover, thereby helping improve communication security.

In one embodiment, further, the security context of the terminal includes the integrity key, and that the second mobility management network element verifies the registration request message based on the second MAC and the security context of the terminal includes: The second mobility management network element verifies the registration request message based on the second MAC and the integrity key.

In one embodiment, the security context of the terminal includes a root key of the first-standard system, and the second mobility management network element derives the integrity key based on the root key of the first-standard system. Further, that the second mobility management network element verifies the registration request message based on the second MAC and the security context of the terminal includes: The second mobility management network element verifies the registration request message based on the second MAC and the integrity key.

In one embodiment, further, the method further includes: The second mobility management network element derives a root key of the second-standard system based on the root key of the first-standard system.

In the foregoing method, the second mobility management network element derives the root key of the second-standard system based on the root key of the first-standard system, so as to subsequently derive, by using the root key of the second-standard system, another key used for communication in the second-standard system.

In one embodiment, if the second mobility management network element successfully verifies the registration request message, the second mobility management network element sends a command message to the terminal, where the command message is used to indicate the terminal to derive the root key of the second-standard system based on the root key of the first-standard system.

According to a fourth aspect, the present disclosure provides a message protection method, applied to handover of a terminal from a first-standard system to a second-standard system, where the first-standard system includes a first mobility management network element, and the second-standard system includes a second mobility management network element. The method includes: First, the second mobility management network element receives a protected registration request message from the terminal, where the protected registration request message includes a MAC, the MAC is generated based on a registration request message and an integrity key, the registration request message is used to request to register with the second-standard system, and the integrity key is an integrity key for communication between the first mobility management network element and the terminal. Then, the second mobility management network element sends a context request message to the first mobility management network element, where the context request message includes the protected registration request message, and the context request message is used to request a security context of the terminal. Then, the second mobility management network element receives a context response message from the first mobility management network element, where the context response message includes the security context of the terminal.

In the foregoing method, when the terminal prepares to hand over from the first-standard system to the second-standard system, the terminal may not have a security context of the second-standard system after handover. Therefore, in the method of the present disclosure, the terminal performs integrity protection on the registration request message by using an integrity key in a security context of the first-standard system before handover. The registration request message is a message for triggering handover. Therefore, the second mobility management network element receives the protected registration request message. Therefore, in the method, security protection is implemented on the message for triggering handover, thereby helping improve communication security.

In one embodiment, the security context of the terminal includes a root key of the second-standard system, and the root key of the second-standard system is derived based on a root key of the first-standard system. Alternatively, the security context of the terminal includes a root key of the first-standard system, and further, the second mobility management network element derives a root key of the second-standard system based on the root key of the first-standard system.

In this way, the second mobility management network element can obtain the root key of the second-standard system.

In one embodiment, further, the second mobility management network element sends a command message to the terminal, where the command message is used to indicate the terminal to derive the root key of the second-standard system based on the root key of the first-standard system.

According to a fifth aspect, the present disclosure provides a message protection method, applied to handover of a terminal from a first-standard system to a second-standard system, where the first-standard system includes a first mobility management network element, and the second-standard system includes a second mobility management network element. The method includes: First, the first mobility management network element receives a context request message from the second mobility management network element, where the context request message includes a protected registration request message, the protected registration request message includes a MAC, the MAC is generated based on a registration request message and an integrity key, the integrity key is an integrity key for communication between the first mobility management network element and the terminal, the registration request message is used to request to register the terminal with the second-standard system, and the context request message is used to request a security context of the terminal. Then, the first mobility management network element verifies the registration request message based on the MAC and the integrity key; and sends a context response message to the second mobility management network element if the first mobility management network element successfully verifies the registration request message, where the context response message includes the security context of the terminal.

In the foregoing method, the context request message received by the first mobility management network element from the second mobility management network element includes the protected registration request message, and the registration request message is a message for triggering handover. In addition, the first mobility management network element further verifies the registration request message, and sends the security context of the terminal to the second mobility management network element if the verification succeeds. Therefore, in the method, security protection is implemented on the message for triggering handover, thereby helping improve communication security.

In one embodiment, the security context of the terminal includes a root key of the first-standard system. Alternatively, the first mobility management network element derives a root key of the second-standard system based on a root key of the first-standard system, where the security context of the terminal includes the root key of the second-standard system According to a sixth aspect, the present disclosure provides an apparatus. The apparatus may be a terminal or a chip. The apparatus has a function for implementing each embodiment of the first aspect. The function may be implemented by hardware, or may be implemented by hardware executing corresponding software. The hardware or the software includes one or more modules corresponding to the function.

According to a seventh aspect, the present disclosure provides an apparatus, including a processor and a memory. The memory is configured to store an instruction. When the apparatus runs, the processor executes the instruction stored in the memory, to enable the apparatus to perform the message protection method in the first aspect or any implementation method of the first aspect. It should be noted that the memory may be integrated in the processor, or may be independent of the processor.

According to an eighth aspect, the present disclosure provides an apparatus. The apparatus includes a processor. The processor is configured to: couple to a memory, read an instruction in the memory, and perform the message protection method in the first aspect or any implementation method of the first aspect according to the instruction.

According to a ninth aspect, the present disclosure provides an apparatus. The apparatus may be a terminal or a chip. The apparatus has a function for implementing each embodiment of the second aspect. The function may be implemented by hardware, or may be implemented by hardware executing corresponding software. The hardware or the software includes one or more modules corresponding to the function.

According to a tenth aspect, the present disclosure provides an apparatus, including a processor and a memory. The memory is configured to store an instruction. When the apparatus runs, the processor executes the instruction stored in the memory, to enable the apparatus to perform the message protection method in the second aspect or any implementation method of the second aspect. It should be noted that the memory may be integrated in the processor, or may be independent of the processor.

According to an eleventh aspect, the present disclosure provides an apparatus. The apparatus includes a processor. The processor is configured to: couple to a memory, read an instruction in the memory, and perform the message protection method in the second aspect or any implementation method of the second aspect according to the instruction.

According to a twelfth aspect, the present disclosure provides an apparatus. The apparatus may be a mobility management network element or a chip. The apparatus has a function for implementing each embodiment of the third aspect. The function may be implemented by hardware, or may be implemented by hardware executing corresponding software. The hardware or the software includes one or more modules corresponding to the function.

According to a thirteenth aspect, the present disclosure provides an apparatus, including a processor and a memory. The memory is configured to store an instruction. When the apparatus runs, the processor executes the instruction stored in the memory, to enable the apparatus to perform the message protection method in the third aspect or any implementation method of the third aspect. It should be noted that the memory may be integrated in the processor, or may be independent of the processor.

According to a fourteenth aspect, the present disclosure provides an apparatus. The apparatus includes a processor. The processor is configured to: couple to a memory, read an instruction in the memory, and perform the message protection method in the third aspect or any implementation method of the third aspect according to the instruction.

According to a fifteenth aspect, the present disclosure provides an apparatus. The apparatus may be a mobility management network element or a chip. The apparatus has a function for implementing each embodiment of the fourth aspect. The function may be implemented by hardware, or may be implemented by hardware executing corresponding software. The hardware or the software includes one or more modules corresponding to the function.

According to a sixteenth aspect, the present disclosure provides an apparatus, including a processor and a memory. The memory is configured to store an instruction. When the apparatus runs, the processor executes the instruction stored in the memory, to enable the apparatus to perform the message protection method in the fourth aspect or any implementation method of the fourth aspect. It should be noted that the memory may be integrated in the processor, or may be independent of the processor.

According to a seventeenth aspect, the present disclosure provides an apparatus. The apparatus includes a processor. The processor is configured to: couple to a memory, read an instruction in the memory, and perform the message protection method in the fourth aspect or any implementation method of the fourth aspect according to the instruction.

According to an eighteenth aspect, the present disclosure provides an apparatus. The apparatus may be a mobility management network element or a chip. The apparatus has a function for implementing each embodiment of the fifth aspect. The function may be implemented by hardware, or may be implemented by hardware executing corresponding software. The hardware or the software includes one or more modules corresponding to the function.

According to a nineteenth aspect, the present disclosure provides an apparatus, including a processor and a memory. The memory is configured to store an instruction. When the apparatus runs, the processor executes the instruction stored in the memory, to enable the apparatus to perform the message protection method in the fifth aspect or any implementation method of the fifth aspect. It should be noted that the memory may be integrated in the processor, or may be independent of the processor.

According to a twentieth aspect, the present disclosure provides an apparatus. The apparatus includes a processor. The processor is configured to: couple to a memory, read an instruction in the memory, and perform the message protection method in the fifth aspect or any implementation method of the fifth aspect according to the instruction.

According to a twenty-first aspect, the present disclosure further provides a computer readable storage medium. The computer readable storage medium stores an instruction, and when the instruction is run on a computer, the computer is enabled to perform the method according to each of the foregoing aspects.

According to a twenty-second aspect, the present disclosure further provides a computer program product including an instruction. When the computer program product is run on a computer, the computer is enabled to perform the method according to each of the foregoing aspects.

According to a twenty-third aspect, the present disclosure further provides a system. The system includes a mobility management network element, and the mobility management network element may be configured to perform the operations performed by the second mobility management network element in the third aspect and any method of the third aspect. In one embodiment, the system may further include another mobility management network element, and the another mobility management network element may be configured to perform the operations performed by the first mobility management network element in the third aspect and any method of the third aspect or in solutions provided in the embodiments of the present disclosure. In one embodiment, the system may further include another device, such as a terminal, that interacts with the first mobility management network element and/or the second mobility management network element in the solutions provided in the embodiments of the present disclosure.

According to a twenty-fourth aspect, the present disclosure further provides a system. The system includes a mobility management network element, and the mobility management network element may be configured to perform the operations performed by the second mobility management network element in the fourth aspect and any method of the fourth aspect. In one embodiment, the system may further include another mobility management network element, and the another mobility management network element may be configured to perform the operations performed by the first mobility management network element in the fifth aspect and any method of the fifth aspect or in the solutions provided in the embodiments of the present disclosure. In one embodiment, the system may further include another device, such as a terminal, that interacts with the first mobility management network element and/or the second mobility management network element in the solutions provided in the embodiments of the present disclosure.

In addition, for technical effects brought by any implementation in the sixth aspect to the twenty-fourth aspect, refer to technical effects brought by different implementations in the first aspect to the fifth aspect. Details are not described herein again.

These aspects or other aspects of the present disclosure are simpler and more understandable in description of the following embodiments.

DESCRIPTION OF EMBODIMENTS

The following further describes in detail the present disclosure with reference to the accompanying drawings. A specific operation method in a method embodiment may also be applied to an apparatus embodiment or a system embodiment. In the description of the present disclosure, unless otherwise specified, "a plurality of" means two or more.

A network architecture and a service scenario described in the embodiments of the present disclosure are intended to describe the technical solutions in the embodiments of the present disclosure more clearly, and do not constitute a limitation to the technical solutions provided in the embodiments of the present disclosure. A person of ordinary skill in the art may know that: With evolution of the network architecture and emergence of new service scenarios, the technical solutions provided in the embodiments of the present disclosure are also applicable to similar technical problems.

Figure 1:
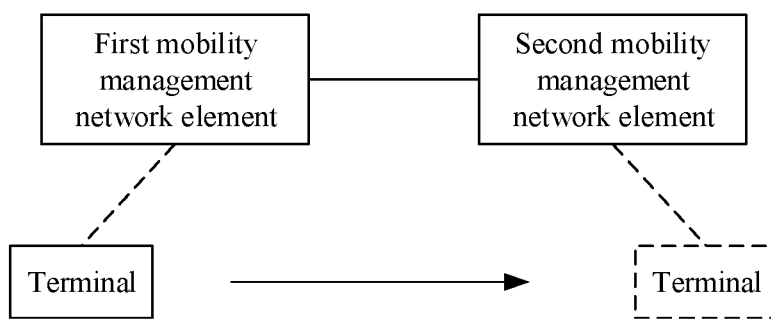
FIG. 1 is a schematic diagram of a network architecture according to one embodiment of the present disclosure.

FIG. 1 is a diagram of a system architecture to which embodiments of the present disclosure are applicable. The system architecture includes a first mobility management network element and a second mobility management network element. In one embodiment, the system architecture further includes a terminal. The first mobility management network element is a mobility management network element of a first-standard system, and the second mobility management network element is a mobility management network element of a second-standard system. In addition, the first-standard system is a system in which the terminal is located before handover, and the second-standard system is a system in which the terminal is located after handover. The "handover" herein is handover of the terminal in an idle mode. For example, the terminal in an idle mode performs handover in a process of moving from a range managed by the first mobility management network element to a range managed by the second mobility management network element.

Compared with the first-standard system, the second-standard system is usually an evolved system. For example, the second-standard system is 5G, and the first-standard system is 4G or 3G. For another example, the second-standard system is 4G, and the first-standard system is 3G. With development of communications technologies, the second-standard system and the first-standard system may alternatively be other possible evolved systems in the future. For example, the second-standard system is a sixth generation (6G) system, and the first-standard system is 5G, 4G, or 3G. For another example, the second-standard system is a next-generation system of 6G, and the first-standard system is 6G. 6G is only used as an example for description, and names of the other possible evolved systems in the future are not limited in the present disclosure.

It should be noted that the present disclosure does not completely exclude a case in which compared with the second-standard system, the first-standard system is an evolved system. For example, if compared with the second-standard system, the first-standard system is an evolved system, but when the terminal hands over from the first-standard system to the second-standard system, a security context of the terminal in the second-standard system is absent from the first-standard system, solutions of the present disclosure are also applicable. Certainly, the present disclosure may further be applicable to another scenario, and this is not limited in the present disclosure.

For example, the first-standard system is 4G, and the second-standard system is 5G. In this case, the first mobility management network element may be a mobility management entity (MME), and the second mobility management network element may be an access and mobility management function (AMF) network element.

The MME is a key control node in a third generation partnership program (3GPP) protocol long term evolution (LTE) network, and the MME has functions such as mobility management, access management, and session management. For example, the MME is responsible for a process of locating and paging a terminal in an idle mode, and the like.

The AMF network element is equivalent to a part having the functions of the MME other than session management, and is mainly responsible for services such as mobility management and access management.

The terminal device in the present disclosure is a device having a wireless communication function, and the terminal device may be deployed on land, for example, an indoor device, an outdoor device, a handheld device, or a vehicle-mounted device; or may be deployed on the water (for example, on a ship); or may be deployed in the air (for example, on a plane, a balloon, or a satellite). The terminal may be a mobile phone, a pad, a computer with a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like; or may be various forms of user equipment (UE), a mobile station (MS), or a terminal device.

Based on the system architecture shown in FIG. 1, when the terminal needs to hand over from the first-standard system to the second-standard system, the terminal may send a request to the second mobility management network element of the second-standard system. For example, the terminal sends a registration request message (in the present disclosure, security protection is performed on the registration request message, in other words, a protected registration request message is sent).

After receiving the protected registration request message, the second mobility management network element sends a context request message to the first mobility management network element, to request a security context of the terminal in the first-standard system. For example, the security context includes a root key of the first-standard system.

After receiving the context request message, first, the first mobility management network element needs to verify content in the context request message, and returns the security context of the terminal to the second mobility management network element if the verification succeeds. In a specific implementation, for example, specific content in the context request message may be verified. The specific content may be sent by the terminal to the second mobility management network element, and then the second mobility management network element adds the specific content to the context request message and sends the context request message to the first mobility management network element. Herein, the second mobility management network element has two cases.

In a first case, the first mobility management network element supports verification of the specific content, but does not support verification of the registration request message.

In the present disclosure, the specific content may be a location update request message. In this case, when sending the protected registration request message to the second mobility management network element, the terminal further needs to send a protected location update request message. Then, the second mobility management network element adds the location update request message to the context request message and sends the context request message to the first mobility management network element. The first mobility management network element verifies the location update request message. The first mobility management network element sends the security context of the terminal to the second mobility management network element if the verification succeeds.

In a second case, the first mobility management network element not only supports verification of the specific content, but also supports verification of the registration request message.

In this case, when sending the protected registration request message to the second mobility management network element, the terminal may not send the specific content. In other words, the terminal may not send the location update request message. The second mobility management network element may add the protected registration request message to the context request message and sends the context request message to the first mobility management network element. Then, the first mobility management network element may verify the protected registration request message. The first mobility management network element sends the security context of the terminal to the second mobility management network element if the verification succeeds.

The following describes the foregoing process in detail with reference to FIG. 1 to FIG. 4.

For ease of description, the following uses an example in which a first-standard system is 4G, a first mobility management network element is an MME, a second-standard system is 5G, and a second mobility management network element is an AMF network element for description. In other words, a terminal hands over from the MME of the 4G to the AMF network element of the 5G. Further, the AMF network element is briefly referred to as an AMF.

In the present disclosure, the 4G mentioned later in any part may be replaced with the first-standard system, the MME may be replaced with the first mobility management network element, the 5G may be replaced with the second-standard system, and the AMF may be replaced with the second mobility management network element. Unified description is given herein, and details are not described again subsequently.

A specific implementation of a case in which the first-standard system and the second-standard system are other systems, and the first mobility management network element and the second mobility management network element are mobility management network elements in the corresponding systems is similar to a specific implementation of the case in which the first-standard system is the 4G, the first mobility management network element is the MME, the second-standard system is the 5G, the second mobility management network element is the AMF, and reference may be made to corresponding descriptions.

Figure 2:
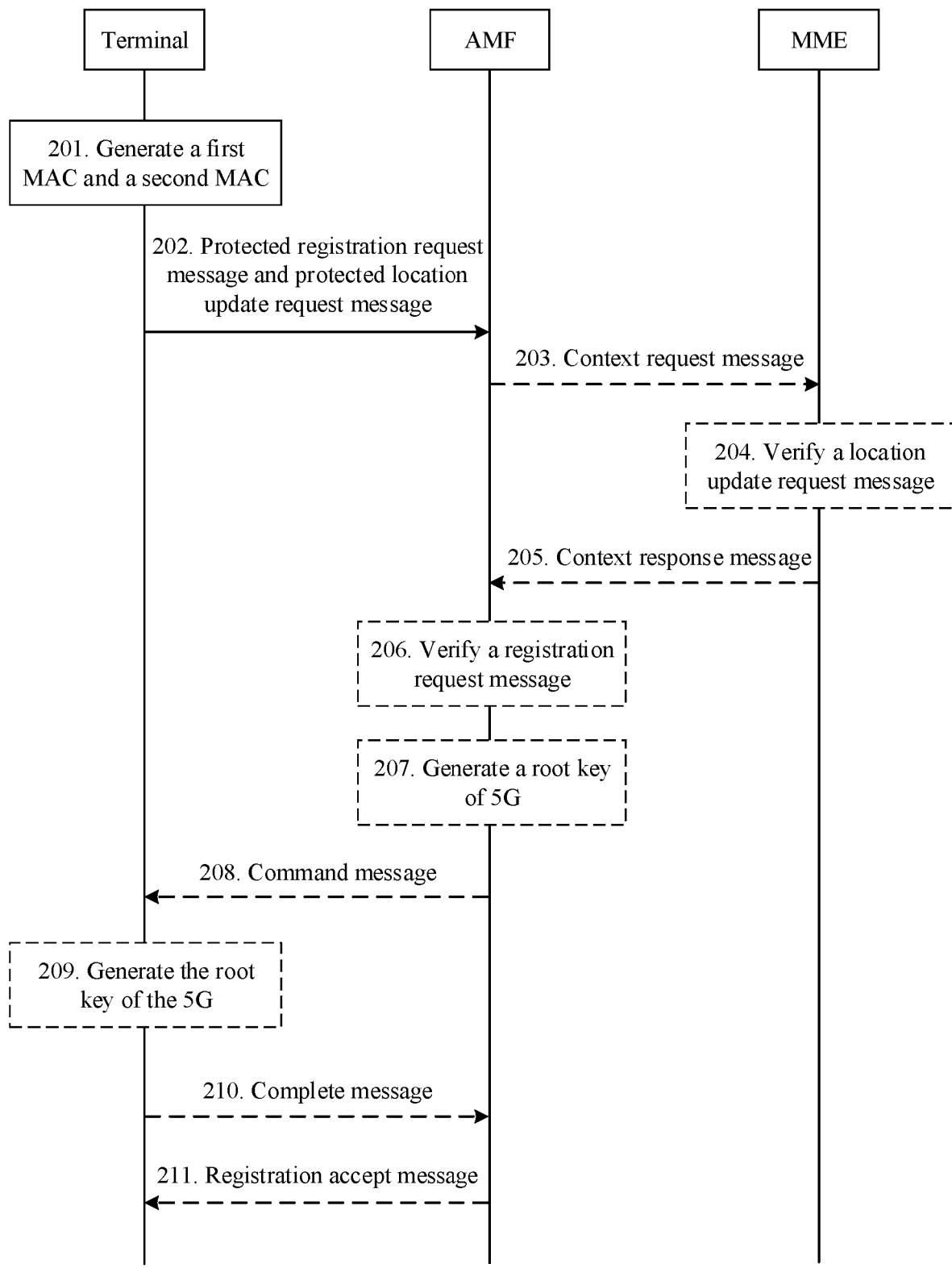
FIG. 2 is a schematic diagram of a message protection method according to the present disclosure.

FIG. 2 shows a message protection method according to the present disclosure. The method may be applied to the foregoing first case of the first mobility management network element, that is, the case in which the first mobility management network element supports verification of a location update request message, but does not support verification of a registration request message. The method may alternatively be applied to the foregoing second case of the first mobility management network element, that is, the case in which the first mobility management network element supports verification of a location update request message and supports verification of a registration request message.

The method shown in FIG. 2 includes the following operations:

Operation 201: A terminal generates a second message authentication code (MAC) based on a registration request message and an integrity key, and generates a first MAC based on a location update request message and the integrity key.

Specifically, first, the terminal generates the registration request message, and then generates the location update request message based on the registration request message. The location update request message is a message that can be identified by an MME.

It may also be understood as that the registration request message cannot be identified by the MME, and the terminal converts a format of the registration request message, to obtain the location update request message that can be identified by the MME. In a specific implementation, for example, in 4G, the location update request message may be a tracking area update (TAU) request message.

The registration request message is used to request to register with a second-standard system (which refers to 5G in this embodiment). Specifically, the registration request message may be used to request the 5G to register current location information of the terminal.

Similarly, the location update request message is also used to request to register with the 5G. Specifically, the location update request message may be used to request the 5G to register the current location information of the terminal.

Then, the terminal generates the second MAC based on the registration request message and the integrity key, and after generating the second MAC, fills a value of the second MAC into a corresponding field of the registration request message, to obtain a protected registration request message. It may also be understood as that the protected registration request message includes the second MAC.

The second MAC generated by the terminal may be used to verify the registration request message. Specifically, an AMF may verify the registration request message based on the second MAC. Further, the AMF may determine, based on a verification result, whether to derive a root key.

Then, the terminal generates the first MAC based on the location update request message and the integrity key, and after generating the first MAC, fills a value of the first MAC into a corresponding field of the location update request message, to obtain a protected location update request message. It may also be understood as that the protected location update request message includes the first MAC.

The first MAC generated by the terminal may be used to verify the location update request message. Specifically, the MME may verify the location update request message based on the first MAC. Further, the MME may determine, based on a verification result, whether to send a security context of the terminal to the AMF. It may also be understood as that, the location update request message may be used by the MME to verify validity of the terminal. Specifically, if the MME successfully verifies the location update request message, the MME considers that the location update request message is not tampered with. It may also be understood as that the MME considers that the terminal is valid, or it may be understood as that the MME considers that the AMF is valid. If the verification fails, the MME considers that the location update request message has been tampered with. It may also be understood as that the MME considers that the terminal is invalid, or it may be understood as that the MME considers that the AMF is invalid.

The integrity key is an integrity key for communication between the MME and the terminal, and the integrity key is derived based on a root key of the 4G. For example, the root key of the 4G may be referred to as Kasme.

It should be noted that a time sequence of generating the first MAC and generating the second MAC is not limited in the present disclosure. To be specific, the first MAC may be generated first, or the second MAC may be generated first, or the first MAC and the second MAC may be generated at the same time.

The following provides several specific implementations in which the terminal generates the second MAC based on the registration request message and the integrity key.

Manner 1: The terminal generates the second MAC based on the registration request message and the integrity key.

Manner 2: The terminal generates the second MAC based on the registration request message, the location update request message, and the integrity key.

Manner 3: The terminal generates the second MAC based on the registration request message, the location update request message, the first MAC, and the integrity key.

Manner 4: The terminal generates the second MAC based on the registration request message, the first MAC, and the integrity key.

In a specific application, any one of the foregoing four methods may be flexibly selected to generate the second MAC. It should be noted that, the foregoing provides examples of several methods for generating the second MAC. A specific application is not limited to the foregoing several methods, and another method may be used to generate the second MAC.

Operation 202: The terminal sends the protected registration request message and the protected location update request message to the AMF. Correspondingly, the AMF receives the protected registration request message and the protected location update request message from the terminal.

In an implementation, the protected registration request message and the protected location update request message may be carried in a same message and sent to the AMF.

In another implementation, the protected registration request message and the protected location update request message may be separately sent to the AMF.

By performing the foregoing operation 201 and operation 202, when the terminal prepares to hand over from the 4G to the 5G, the terminal may not have a security context of the 5G. Therefore, in the method of the present disclosure, the terminal performs integrity protection on the registration request message and the location update request message by using an integrity key in a security context of the 4G. Both the registration request message and the location update request message are messages for triggering handover. Therefore, by performing operation 201 and operation 202, security protection is implemented on the message for triggering handover, thereby helping improve communication security.

Further, for an AMF side and an MME side, in one embodiment, the method shown in FIG. 2 may further include the following operations:

Operation 203: The AMF sends a context request message to the MME. Correspondingly, the MME receives the context request message from the AMF.

The context request message includes the protected location update request message, and the context request message is used to request the security context of the terminal.

By performing the foregoing operation 203, the context request message received by the MME from the AMF includes the protected location update request message, and the location update request message is a message for triggering handover. By performing operation 203, security protection is implemented on the message for triggering handover, thereby helping improve communication security.

Operation 204: The MME verifies the location update request message.

Specifically, the MME obtains the protected location update request message from the context request message, and obtains the location update request message and the first MAC from the protected location update request message. Then, the MME verifies the location update request message based on the first MAC.

Specifically, the MME generates a MAC based on the location update request message and the integrity key. If the generated MAC is the same as the first MAC, the verification succeeds; and if the generated MAC and the first MAC are different, the verification fails.

If the MME successfully verifies the location update request message, operation 205 and operation 206 are performed. If the MME fails to verify the location update request message, the MME may notify the AMF that the MME fails to verify the location update request message, and then the AMF may send a registration reject message to the terminal.

Operation 205: The MME sends a context response message to the AMF. Correspondingly, the AMF receives the context response message from the MME.

The context response message includes the security context of the terminal, and the security context of the terminal includes the root key of the 4G. The root key of the 4G may also be referred to as a key of an access security management entity (Kasme). The access security management entity (ASME) herein is an entity that receives a top-layer key from a home subscriber server (HSS), and the top-layer key may be used to derive a key of an access network. From a perspective of the 4G access network, a role of the ASME is played by the MME. In other words, it may be understood as that the MME has a function of the ASME. For example, the ASME may be a logical function unit or a physical function unit of the MME.

In one embodiment, the security context of the terminal included in the context response message may further include at least one of the following: a non-access stratum (NAS) encryption key used for communication between the terminal and the MME, an NAS integrity key used for communication between the terminal and the MME (that is, an integrity key of the 4G), and an encryption algorithm used for communication between the terminal and the MME, an integrity protection algorithm used for communication between the terminal and MME, and the like.

If the MME successfully verifies the location update request message, the MME considers that the location update request message is valid, or considers that the terminal is valid. Therefore, the MME adds the security context of the terminal into the context response message and sends the context response message to the AMF.

Further, in one embodiment, the method further includes the following operations:

Operation 206: The AMF verifies the registration request message.

Specifically, the AMF obtains the registration request message and the second MAC from the protected registration request message, and verifies validity of the registration request message based on the second MAC.

Specifically, the AMF generates a MAC based on the integrity key and the registration request message. If the generated MAC is the same as the second MAC, the verification succeeds; and if the generated MAC and the second MAC are different, the verification fails.

If the AMF successfully verifies the registration request message, operation 207 to operation 211 may be performed.

If the AMF fails to verify the registration request message, the AMF may send the registration reject message to the terminal.

It should be noted that a specific method for generating, by the AMF, a MAC based on the integrity key and the registration request message should be the same as a method for generating the second MAC by the terminal. In other words, if the terminal generates the second MAC by using a method in the foregoing four methods, the AMF should generate the MAC by using the same method.

Further, it should be noted that the integrity key used when the AMF generates the MAC is the integrity key used when the terminal generates the second MAC, that is, the integrity key of the 4G. A manner in which the AMF obtains the integrity key includes but is not limited to the following manners:

Manner 1: The context response message in operation 205 carries the integrity key.

Manner 2: The context response message in operation 205 carries the root key of the 4G, and the AMF derives the integrity key based on the root key of the 4G.

Operation 207: The AMF generates a root key of the 5G based on the root key of the 4G.

The root key of the 5G (which may also be referred to as a key of an access and mobility management function network element (Kamf)) may be used to derive another key that needs to be used by the terminal in 5G communication, for example, an NAS encryption key of the 5G, or an NAS integrity key of the 5G.

Further, in one embodiment, the method further includes the following operations:

Operation 208: The AMF sends a command message to the terminal. Correspondingly, the terminal receives the command message from the AMF.

The command message is used to indicate the terminal to derive the root key of the 5G based on the root key of the 4G. In an implementation, the command message may be, for example, a non-access stratum security mode command (NAS SMC) message.

Operation 209: The terminal derives the root key of the 5G based on the root key of the 4G.

A method for deriving, by the terminal, the root key of the 5G based on the root key of the 4G is the same as a method for deriving, by the AMF, the root key of the 5G based on the root key of the 4G, so that the root key of the 5G derived by the terminal is the same as the root key of the 5G derived by the AMF.

By performing the foregoing operation 207 to operation 209, the terminal and the AMF derive the same root key of the 5G, so as to further separately derive another key used for communication, for example, an NAS encryption key of the 5G, or an NAS integrity key of the 5G.

Further, in one embodiment, the method further includes the following operation:

Operation 210: The terminal sends a complete message to the AMF. Correspondingly, the AMF receives the complete message from the terminal.

The complete message is used to notify the AMF that non-access stratum security is already activated. For example, the complete message may be a non-access stratum security mode complete (NAS SMP) message.

Further, in one embodiment, the method further includes the following operation:

Operation 211: The AMF sends a registration accept message to the terminal. Correspondingly, the terminal receives the registration accept message from the AMF.

The registration accept message is used to notify the terminal that registration succeeds or registration completes.

In the foregoing embodiment of the present disclosure, the terminal performs integrity protection on the sent messages for triggering handover (including the registration request message and the location update request message), which helps improve communication security. In addition, the terminal and the 5G system after handover derive the root key, so that the terminal may communicate with the 5G based on the root key of the 5G, thereby further improving communication security.

Figure 3:
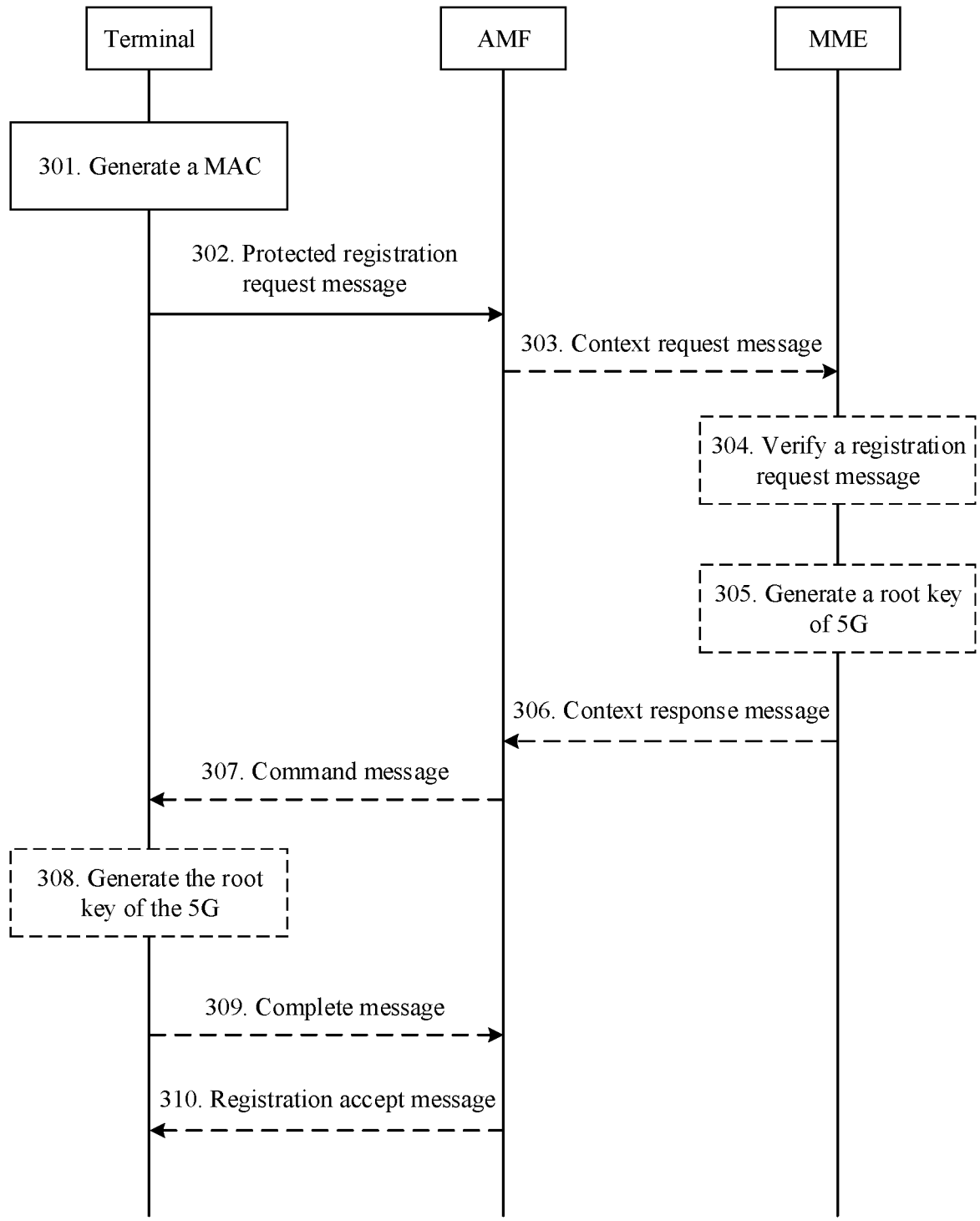
FIG. 3 is a schematic diagram of another message protection method according to the present disclosure.

FIG. 3 shows a message protection method according to the present disclosure. The method may be applied to the foregoing second case of the first mobility management network element, that is, the case in which the first mobility management network element not only supports verification of a location update request message, but also supports verification of a registration request message.

The method shown in FIG. 3 includes the following operations:

Operation 301: A terminal generates a MAC based on a registration request message and an integrity key.

The registration request message is used to request to register with a second-standard system (which refers to 5G in this embodiment). Specifically, the registration request message may be used to request the 5G to register current location information of the terminal. In addition, the registration request message can be identified by an MME.

Specifically, the terminal generates the MAC based on the registration request message and the integrity key, and after generating the MAC, fills a value of the MAC into a corresponding field of the registration request message, to obtain a protected registration request message. It may also be understood as that the protected registration request message includes the MAC.

The MAC generated by the terminal may be used to verify the registration request message. Specifically, the MME verifies the registration request message based on the MAC, and determines, based on a verification result, whether to send a security context of the terminal to an AMF. It may also be understood as that, the registration request message may be used by the MME to verify validity of the terminal. Specifically, if the MME successfully verifies the registration request message, the MME considers that the registration request message is not tampered with. It may also be understood as that the MME considers that the terminal is valid, or it may be understood as that the MME considers that the AMF is valid. If the verification fails, the MME considers that the registration request message has been tampered with. It may also be understood as that the MME considers that the terminal is invalid, or it may be understood as that the MME considers that the AMF is invalid.

The integrity key is an integrity key for communication between the MME and the terminal. The integrity key is derived based on a root key of 4G. For example, the root key of the 4G may be referred to as Kasme.

Operation 302: The terminal sends the protected registration request message to the AMF. Correspondingly, the AMF receives the protected registration request message from the terminal.

By performing the foregoing operation 301 and operation 302, when the terminal prepares to hand over from the 4G to the 5G, the terminal may not have a security context of the 5G. Therefore, in the method of the present disclosure, the terminal performs integrity protection on the registration request message by using an integrity key in a security context of the 4G. The registration request message is a message for triggering handover. Therefore, by performing operation 301 and operation 302, security protection is implemented on the message for triggering handover, thereby helping improve communication security.

Further, for an AMF side and an MME side, in one embodiment, the method shown in FIG. 3 may further include the following operations:

Operation 303: The AMF sends a context request message to the MME. Correspondingly, the MME receives the context request message from the AMF.

The context request message includes the protected registration request message, and the context request message is used to request the security context of the terminal.

By performing the foregoing operation 303, the context request message received by the MME from the AMF includes the protected registration request message, and the registration request message is a message for triggering handover. By performing operation 303, security protection is implemented on the message for triggering handover, thereby helping improve communication security.

Operation 304: The MME verifies the registration request message.

The MME obtains the protected registration request message from the context request message, and obtains the registration request message and the MAC from the protected registration request message. Then, the MME verifies the registration request message based on the MAC.

Specifically, the MME generates a MAC based on the registration request message and the integrity key. If the generated MAC is the same as the MAC obtained from the protected registration request message, the verification succeeds; and if the generated MAC and the MAC obtained from the protected registration request message are different, the verification fails.

If the MME successfully verifies the registration request message, operation 305 to operation 310 are performed. If the MME fails to verify the registration request message, the MME may notify the AMF that the MME fails to verify the registration request message, and then the AMF may send a registration reject message to the terminal.

It should be noted that a specific method for generating, by the MME, a MAC based on the integrity key and the registration request message should be the same as a method for generating the MAC by the terminal.

Operation 305: The MME derives a root key of the 5G based on the root key of the 4G.

The root key of the 5G (which may also be referred to as Kamf) may be used to derive another key that needs to be used by the terminal in 5G communication, for example, an NAS encryption key of the 5G, or an NAS integrity key of the 5G.

Operation 306: The MME sends a context response message to the AMF. Correspondingly, the AMF receives the context response message from the MME.

The context response message includes the security context of the terminal, and the security context of the terminal includes the root key of the 5G. In one embodiment, the security context of the terminal included in the context response message may further include a security capability of the terminal and the like.

If the MME successfully verifies the registration request message, the MME considers that the registration request message is valid, or considers that the terminal is valid. Therefore, the MME adds the security context of the terminal into the context response message and sends the context response message to the AMF.

In an alternative implementation, the foregoing operation 305 and operation 306 may be replaced with the following operation 305' and operation 306' as a whole.

Operation 305': The MME sends a context response message to the AMF. Correspondingly, the AMF receives the context response message from the MME.

The context response message includes the security context of the terminal, and the security context of the terminal includes the root key of the 4G.

Operation 306': The AMF derives a root key of the 5G based on the root key of the 4G.

A main difference between the solution of the foregoing operation 305' and operation 306' and the solution of the foregoing operation 305 and operation 306 lies in that: In the solution of the foregoing operation 305 and operation 306, the MME derives the root key of the 5G and sends the root key to the AMF. In the solution of the foregoing operation 305' and operation 306', the MME sends the root key of the 4G to the AMF, and then the AMF derives the root key of the 5G based on the root key of the 4G.

Further, in one embodiment, the method further includes the following operations:

Operation 307: The AMF sends a command message to the terminal. Correspondingly, the terminal receives the command message from the AMF.

The command message is used to indicate the terminal to derive the root key of the 5G based on the root key of the 4G. In an implementation, the command message may be, for example, an NAS SMC message.

Operation 308: The terminal derives the root key of the 5G based on the root key of the 4G.

A method for deriving, by the terminal, the root key of the 5G based on the root key of the 4G is the same as a method for deriving, by the AMF or the MME, the root key of the 5G based on the root key of the 4G, so that the root key of the 5G derived by the terminal is the same as the root key of the 5G derived by the AMF or the MME.

By performing the foregoing operation 305 to operation 308, the terminal and the AMF use the same root key of the 5G, so as to further separately derive another key used for communication, for example, an NAS encryption key of the 5G, or an NAS integrity key of the 5G.

Further, in one embodiment, the method further includes the following operation:

Operation 309: The terminal sends a complete message to the AMF. Correspondingly, the AMF receives the complete message from the terminal.

The complete message is used to notify the AMF that non-access stratum security is already activated. For example, the complete message may be an NAS SMP message.

Further, in one embodiment, the method further includes the following operation:

Operation 310: The AMF sends a registration accept message to the terminal. Correspondingly, the terminal receives the registration accept message from the AMF.

The registration accept message is used to notify the terminal that registration succeeds or registration completes.

In the foregoing embodiment of the present disclosure, the terminal performs integrity protection on the sent message for triggering handover (including the registration request message), which helps improve communication security. In addition, the terminal and the 5G system after handover derive the root key, so that the terminal may communicate with the 5G based on the root key of the 5G, thereby further improving communication security. Further, in this embodiment of the present disclosure, the terminal sends only the registration request message, and does not send the location update request message. The MME verifies the registration request message, so that overheads can be reduced, and system performance can be improved.

In a specific implementation, if the MME can verify specific content, for example, the location update request message, but cannot verify the registration request message, the embodiment shown in FIG. 2 may be used. To be specific, both the registration request message and the location update request message are carried. In this case, the MME is usually an MME that is not upgraded. To be specific, the MME that is not upgraded can verify only specific content. Herein, the MME that is not upgraded is the MME in the 4G. An interaction manner between the MME and the AMF is the same as an interaction manner between the MME and another MME, or it may be understood as that the MME considers the AMF as an MME.

If the MME can verify other information than the specific content, for example, the registration request message in the present disclosure, the embodiment shown in FIG. 3 may be used. To be specific, the location update request message is not needed, but only the registration request message is carried. In this case, the MME is usually an upgraded MME. To be specific, the upgraded MME can not only verify the specific content, but also verify other information, for example, the registration request message in the present disclosure.

In an implementation, it may be pre-configured that the terminal uses the implementation shown in FIG. 2, or it is pre-configured that the terminal uses the implementation shown in FIG. 3. In this implementation, the terminal does not need to pay attention to a specific type of the MME (an upgraded MME or an MME that is not upgraded), but only needs to perform the method in a preconfigured manner.

Figure 4:
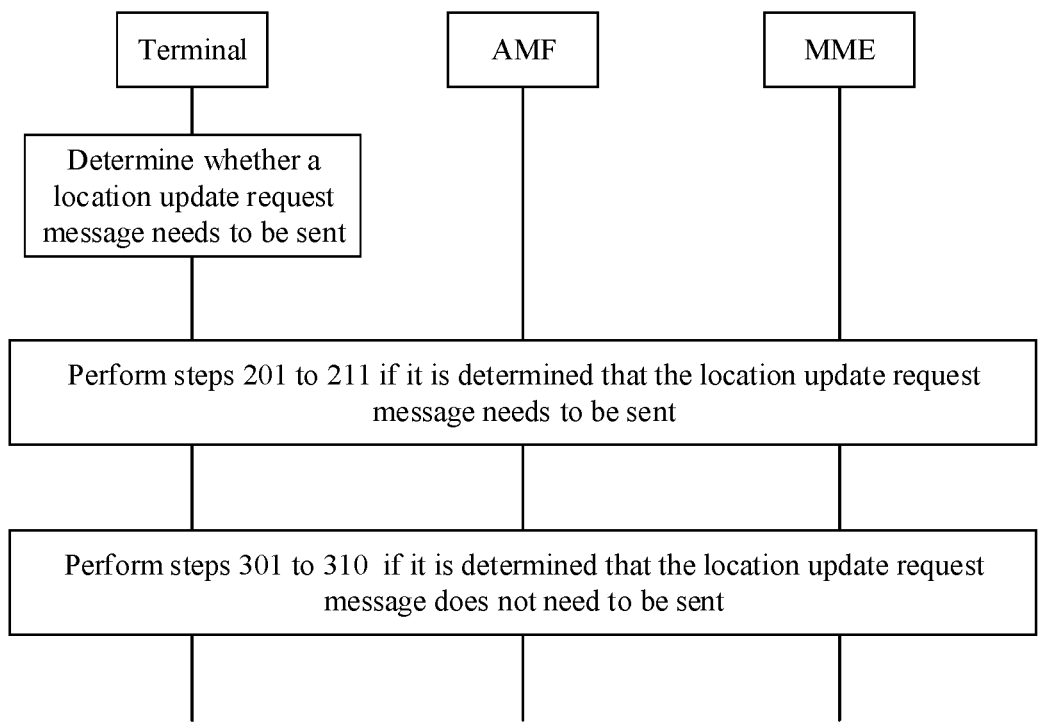
FIG. 4 is a schematic diagram of still another message protection method according to the present disclosure.

In still another implementation, alternatively, the terminal may determine to use the implementation shown in FIG. 2 or FIG. 3. For example, FIG. 4 shows still another message protection method according to the present disclosure.

A terminal determines whether a location update request message needs to be carried. If the terminal determines that the location update request message needs to be carried, the terminal performs the foregoing embodiment shown in FIG. 2, in other words, performs operation 201 to operation 211. If the terminal determines that the location update request message does not need to be carried, the terminal performs the foregoing embodiment shown in FIG. 3, in other words, performs operation 301 to operation 310.

In this embodiment, before performing the message protection method of the present disclosure, the terminal first determines whether the location update request message needs to be carried, and then performs the method by using a corresponding method. Therefore, no matter whether an MME is upgraded, the method shown in FIG. 4 is applicable, and therefore is relatively flexible.

Specifically, the terminal may determine, in the following manner, whether the location update request message needs to be carried.

The terminal determines whether the MME is capable of verifying integrity of a registration request message of 5G, and if determining that the MME is not capable of verifying integrity of the registration request message of the 5G, determines that the location update request message needs to be sent, or if determining that the MME is capable of verifying integrity of the registration request message of the 5G, determines that the location update request message does not need to be sent.

In an implementation, a manner in which the terminal determines whether the MME has a capability of verifying integrity of the registration request message of the 5G, for example, may be:

When the terminal accesses a 4G network for the first time, an attach request message sent by the terminal carries a 4G security capability and a 5G security capability of the terminal. Therefore, after the MME authenticates the terminal, the MME sends an NAS SMC message to the terminal to activate NAS security between the MME and the terminal. The NAS SMC message includes a security capability of the terminal carried in the attach request. If the MME is an upgraded MME, the MME can identify the 5G security capability of the terminal, and therefore, the MME sends the 4G security capability and the 5G security capability of the terminal back to the terminal by using the NAS SMC message (for verification by the terminal). If the MME has not been upgraded, the MME cannot identify the 5G security capability of the terminal, and therefore, the MME only sends the 4G security capability of the terminal back to the terminal by using the NAS SMC message. Therefore, the terminal may determine, based on whether the received NAS SMC message includes the 5G security capability of the terminal, whether the MME has been upgraded, that is, determine whether the MME has a capability of verifying integrity of the registration request message of the 5G.

If the NAS SMC message includes the 5G security capability of the terminal, it indicates that the MME has been upgraded, and further indicates that the MME has the capability of verifying integrity of the registration request message of the 5G.

If the NAS SMC message does not include the 5G security capability of the terminal, it indicates that the MME has not been upgraded, and further indicates that the MME does not have the capability of verifying integrity of the registration request message of the 5G.

It should be noted that a message name used in any one of the foregoing embodiments is not limited in the present disclosure. For example, the registration request message may also be referred to as a request message, a registration request, a first message, or the like. The location update request message may also be referred to as a location update request message, an update request message, a report message, or the like. The context request message may also be referred to as a request message, a context message, or the like. The context response message may also be referred to as a response message or a feedback message. The command message may also be referred to as a notification message, a feedback message, or the like. With evolution of communications technologies, names of the foregoing messages may change. However, as long as a definition of a function of each message in the present disclosure is met, the messages shall fall within the protection scope of the present disclosure.

The foregoing mainly describes the solutions provided in the present disclosure from a perspective of interaction between network elements. It may be understood that, to implement the foregoing functions, each network element includes a corresponding hardware structure and/or software module for executing each function. A person skilled in the art should easily be aware that, in combination with the examples described in the embodiments disclosed in this specification, units and algorithm operations may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 5:
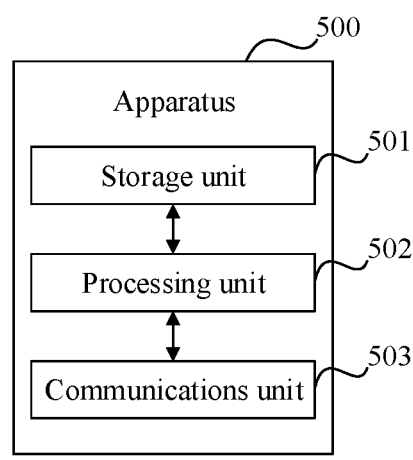
FIG. 5 is a schematic diagram of an apparatus according to the present disclosure.

When an integrated unit is used, FIG. 5 is a block diagram of an example of an apparatus in an embodiment of the present disclosure. The apparatus 500 may exist in a form of software, may be a mobility management network element, or may be a chip in a mobility management network element. The apparatus 500 includes a processing unit 502 and a communications unit 503. The processing unit 502 is configured to control and manage an action of the apparatus 500. The communications unit 503 is configured to support communication between the apparatus 500 and another network entity (for example, a terminal or another mobility management network element). The apparatus 500 may further include a storage unit 501, configured to store program code and data of the apparatus 500.

The processing unit 502 may be a processor or a controller, such as a general-purpose central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processing unit 502 may implement or execute various examples of logical blocks, modules, and circuits described with reference to content disclosed in the present disclosure. Alternatively, the processor may be a combination of processors implementing a computing function, for example, a combination of one or more microprocessors, or a combination of the DSP and a microprocessor. The communications unit 503 may be a communications interface, a transceiver, a transceiver circuit, or the like. The communications interface is a general term. In a specific implementation, the communications interface may include a plurality of interfaces. For example, the communications interface may include: an interface between the mobility management network element and a terminal, an interface between the mobility management network element and another mobility management network element, and/or another interface. The storage unit 501 may be a memory.

The apparatus 500 shown in FIG. 5 may be the first mobility management network element in the present disclosure, or may be the second mobility management network element in the present disclosure.

When the apparatus 500 is the first mobility management network element, the processing unit 502 may support the apparatus 500 in performing actions of the MME in the foregoing method examples. For example, the processing unit 502 is configured to support the apparatus 500 in performing operation 204 in FIG. 2 and FIG. 4, operation 304 and operation 305 in FIG. 3 and FIG. 4, and/or another process of the technology described in this specification. The communications unit 503 may support communication between the apparatus 500 and the second mobility management network element or another network element. For example, the communications unit 503 is configured to support the apparatus 500 in performing operation 203 and operation 205 in FIG. 2 and FIG. 4, and operation 303 and operation 306 in FIG. 3 and FIG. 4.

When the apparatus 500 is the second mobility management network element, the processing unit 502 may support the apparatus 500 in performing actions of the AMF in the foregoing method examples. For example, the processing unit 502 is configured to support the apparatus 500 in performing operation 206 and operation 207 in FIG. 2 and FIG. 4. The communications unit 503 may support communication between the apparatus 500 and the terminal, the first mobility management network element, or another network element. For example, the communications unit 503 may support the apparatus 500 in performing operation 202, operation 203, operation 205, operation 208, operation 210, and operation 211 in FIG. 2 and FIG. 4, and operation 302, operation 303, operation 306, operation 307, operation 309, and operation 310 in FIG. 3 and FIG. 4.

Figure 6:
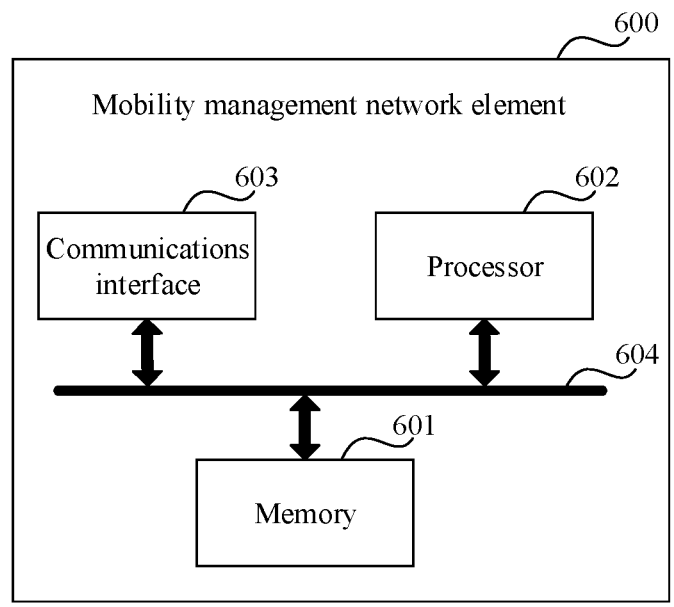
FIG. 6 is a schematic diagram of a mobility management network element according to the present disclosure.

When the processing unit 502 is a processor, the communications unit 503 is a communications interface, and the storage unit 501 is a memory, the apparatus 500 in this embodiment of the present disclosure may be a mobility management network element 600 shown in FIG. 6.

Referring to FIG. 6, the mobility management network element 600 includes: a processor 602, a communications interface 603, and a memory 601. In one embodiment, the mobility management network element 600 may further include a bus 604. The communications interface 603, the processor 602, and the memory 601 may be connected to each other by using the bus 604. The bus 604 may be a peripheral component interconnect (PCI) bus, an extended industry standard architecture (EISA) bus, or the like. The bus 604 may be classified into an address bus, a data bus, a control bus, and the like. For ease of representation, only one thick line is used to represent the bus in FIG. 6, but this does not mean that there is only one bus or only one type of bus.

Figure 7:
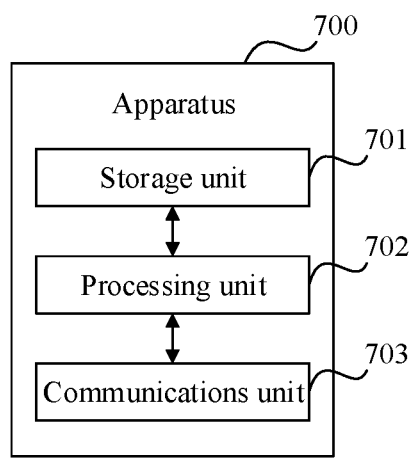
FIG. 7 is a schematic diagram of another apparatus according to the present disclosure.

When an integrated unit is used, FIG. 7 is a block diagram of an example of another apparatus in an embodiment of the present disclosure. The apparatus 700 may exist in a form of software, may be a terminal, or may be a chip in a terminal. The apparatus 700 includes a processing unit 702 and a communications unit 703. The processing unit 702 is configured to control and manage an action of the apparatus 700. For example, the processing unit 702 is configured to support the apparatus 700 in performing operation 201 and operation 209 in FIG. 2 and FIG. 4, operation 301 and operation 308 in FIG. 3 and FIG. 4, and the operation of "determining whether the location update request message needs to be sent" in FIG. 4, and/or another process of the technology described in this specification. The communications unit 703 is configured to support communication between the apparatus 700 and another network entity (for example, the second mobility management network element). For example, the communications unit 703 is configured to support the apparatus 700 in performing operation 202, operation 208, operation 210, and operation 211 in FIG. 2 and FIG. 4, and operation 302, operation 307, operation 309, and operation 310 in FIG. 3 and FIG. 4. The apparatus 700 may further include a storage unit 701, configured to store program code and data of the apparatus 700.

The processing unit 702 may be a processor or a controller, such as a general-purpose CPU, a general-purpose processor, a DSP, an ASIC, an FPGA, or another programmable logic device, a transistor logic device, a hardware component, or any combination thereof. The processing unit 702 may implement or execute various examples of logical blocks, modules, and circuits described with reference to content disclosed in the present disclosure. Alternatively, the processor may be a combination of processors implementing a computing function, for example, a combination of one or more microprocessors, or a combination of the DSP and a microprocessor. The communications unit 703 may be a communications interface, a transceiver, a transceiver circuit, or the like. The storage unit 701 may be a memory.

Figure 8:
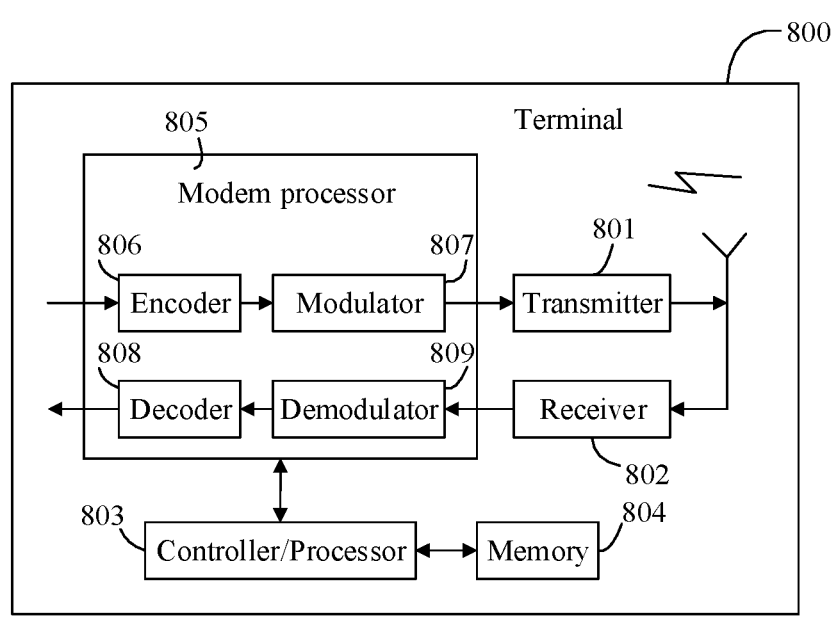
FIG. 8 is a schematic diagram of a terminal according to the present disclosure.

When the processing unit 702 is a processor, the communications unit 703 is a transceiver, and the storage unit 701 is a memory, the apparatus 700 in this embodiment of the present disclosure may be a terminal shown in FIG. 8.

FIG. 8 is a simplified schematic diagram of one embodiment structure of a terminal in an embodiment of the present disclosure. The terminal 800 includes a transmitter 801, a receiver 802, and a processor 803. The processor 803 may alternatively be a controller, and is represented as "controller/processor 803" in FIG. 8. In one embodiment, the terminal 800 may further include a modem processor 805, and the modem processor 805 may include an encoder 806, a modulator 807, a decoder 808, and a demodulator 809.

In an example, the transmitter 801 adjusts (for example, through analog conversion, filtering, amplification, and up-conversion) an output sampling and generates an uplink signal. The uplink signal is transmitted to the base station in the foregoing embodiments by using an antenna. In a downlink, the antenna receives a downlink signal transmitted by the base station in the foregoing embodiments. The receiver 802 adjusts (such as through filtering, amplification, down-conversion, and digitization) a signal received from the antenna and provides an input sampling. In the modem processor 805, the encoder 806 receives service data and a signaling message that are to be sent on an uplink, and processes (for example, through formatting, encoding, and interleaving) the service data and the signaling message. The modulator 807 further processes (for example, through symbol mapping and modulation) encoded service data and signaling message and provides an output sampling. The demodulator 809 processes (for example, through demodulation) the input sampling and provides symbol estimation. The decoder 808 processes (for example, through de-interleaving and decoding) the symbol estimation and provides decoded data and signaling message sent to the terminal 800. The encoder 806, the modulator 807, the demodulator 809, and the decoder 808 may be implemented by the composite modem processor 805. The units perform processing based on a radio access technology (for example, access technologies of LTE and other evolved systems) used by a radio access network. It should be noted that, when the terminal 800 does not include the modem processor 805, the foregoing functions of the modem processor 805 may alternatively be completed by the processor 803.

The processor 803 controls and manages an action of the terminal 800, and is configured to perform a processing process performed by the terminal 800 in the foregoing embodiments of the present disclosure. For example, the processor 803 is further configured to perform a processing process related to the terminal in the methods shown in FIG. 2 to FIG. 4 and/or another process of the technical solutions described in the present disclosure.

Further, the apparatus 800 may further include a memory 804. The memory 804 is configured to store program code and data of the apparatus 800.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

The various illustrative logical units and circuits described in the embodiments of the present disclosure may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. In one embodiment, the general-purpose processor may alternatively be any traditional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Operations of the methods or algorithms described in the embodiments of the present disclosure may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor can read information from the storage medium and write information to the storage medium. In one embodiment, the storage medium may alternatively be integrated into a processor. The processor and the storage medium may be arranged in an ASIC, and the ASIC may be arranged in a terminal device. Alternatively, the processor and the storage medium may also be arranged in different components of the terminal device.

These computer program instructions may also be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Although the present disclosure is described with reference to specific features and the embodiments thereof, obviously, various modifications and combinations may be made to them without departing from the spirit and scope of the present disclosure. Correspondingly, the specification and the accompanying drawings are merely examples of description of the present disclosure defined by the accompanying claims, and are considered as any of or all modifications, variations, combinations or equivalents that cover the scope of the present disclosure. Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A message protection method, applied to handover of a terminal from a first-standard system to a second-standard system, wherein the first-standard system comprises a first mobility management network element, and the second-standard system comprises a second mobility management network element, the method comprising:
   in response to determining that the first mobility management network element has a capability of verifying integrity of a registration request message for the second-standard system, determining, by the terminal, that a location update request message does not need to be sent;
   in response to determining that the location update request message does not need to be sent:
   generating, by the terminal, a message authentication code (MAC) based on a registration request message and an integrity key, wherein the registration request message is to register with the second-standard system, the integrity key is for protecting communication between the first mobility management network element and the terminal;
   sending, by the terminal, a protected registration request message to the second mobility management network element, wherein the protected registration request message comprises the registration request message and the MAC;
   receiving, by the terminal, a command message from the second mobility management network element; and
   deriving, by the terminal, a root key of the second-standard system based on a root key of the first-standard system according to the command message.

2. The method according to claim 1, further comprising:
   in response to determining that the first mobility management network element does not have the capability of verifying integrity of the registration request message for the second-standard system, determining, by the terminal, that the location update request message needs to be sent;
   in response to determining that the location update request message needs to be sent:
   generating, by the terminal, another MAC based on the location update request message and the integrity key, wherein the other MAC is to verify the location update request message; and
   sending, by the terminal, a protected location update request message to the second mobility management network element, wherein the protected location update request message includes the other MAC.

3. The method according to claim 1, further comprising:
   sending a non-access stratum security mode complete (NAS SMP) message to the second mobility management network element.

4. The method according to claim 3, further comprising:
   receiving a registration accept message from the second mobility management network element.

5. An apparatus, comprising:
at least one processor; and
a memory coupled to the at least one processor and having program instructions stored thereon which, when executed by the at least one processor, cause the apparatus to:
in response to determining that a first mobility management network element has a capability of verifying integrity of a registration request message for a second-standard system, determine that a location update request message does not need to be sent;
in response to determining that the location update request message does not need to be sent:
generate a message authentication code (MAC) based on a registration request message and an integrity key, wherein the registration request message is to register with a second-standard system, the integrity key is for protecting communication between a first mobility management network element in a first-standard system and the apparatus;
send a protected registration request message to a second mobility management network element, wherein the protected registration request message comprises the registration request message and the MAC;
receive a command message from the second mobility management network element; and
derive a root key of the second-standard system based on a root key of the first-standard system according to the command message.

6. The apparatus according to claim 5, wherein the instructions further cause the apparatus to:
in response to determining that the first mobility management network element does not have the capability of verifying integrity of the registration request message for the second-standard system, determine that the location update request message needs to be sent;
in response to determining that the location update request message needs to be sent:
generate another MAC based on the location update request message and the integrity key, wherein the other MAC is to verify the location update request message; and
send a protected location update request message to a second mobility management network element, wherein the protected location update request message includes the other MAC.

7. The apparatus according to claim 5, wherein the instructions cause the apparatus to:
send a non-access stratum security mode complete (NAS SMP) message to the second mobility management network element.

8. The apparatus according to claim 7, wherein the instructions cause the apparatus to:
receive a registration accept message from the second mobility management network element.

9. The apparatus according to claim 5, wherein the apparatus is a terminal, or a chip in a terminal.

* * * * *